United States Patent [19]
Andress et al.

[11] Patent Number: 5,862,308
[45] Date of Patent: Jan. 19, 1999

[54] FAULT INTERCEPT AND RESOLUTION PROCESS INDEPENDENT OF OPERATING SYSTEM

[75] Inventors: Sidney L. Andress; Lowell D. McCulley, both of Glendale, Ariz.

[73] Assignee: Bull HN Information Systems Inc., Billerica, Mass.

[21] Appl. No.: 869,787

[22] Filed: Jun. 5, 1997

Related U.S. Application Data

[60] Provisional application No. 60/032,442 Dec. 3, 1996.

[51] Int. Cl.[6] .............................. G06F 9/00; G06F 11/22
[52] U.S. Cl. .............................. 395/182.08; 395/183.13; 395/591; 395/733
[58] Field of Search .................. 395/182.08, 182.13, 395/182.15, 183.01, 580, 581, 589, 590, 591, 733

[56] References Cited

U.S. PATENT DOCUMENTS

| | | | |
|---|---|---|---|
| 4,713,758 | 12/1987 | De Kelaita et al. | 395/183.18 |
| 4,779,188 | 10/1988 | Gum et al. | 395/500 |
| 4,891,785 | 1/1990 | Donohoo | 395/200.47 |
| 5,003,466 | 3/1991 | Schan et al. | 395/183.17 |
| 5,016,166 | 5/1991 | Van Loo et al. | 395/674 |
| 5,276,862 | 1/1994 | McCulley et al. | 395/182.13 |
| 5,325,517 | 6/1994 | Baker et al. | 395/182.09 |
| 5,369,767 | 11/1994 | Dinwiddie, Jr. et al. | 395/737 |
| 5,511,217 | 4/1996 | Nakajima et al. | 395/800.02 |
| 5,553,232 | 9/1996 | Wilhite et al. | 395/182.04 |
| 5,557,737 | 9/1996 | Wilhite et al. | 395/182.04 |
| 5,566,298 | 10/1996 | Boggs et al. | 395/182.08 |
| 5,712,997 | 1/1998 | Dice | 395/393 |

Primary Examiner—Ly Hua
Attorney, Agent, or Firm—J S Solakian; J H Phillips

[57] ABSTRACT

A fault handling process in a computer system subject to CPU design errors and functioning under an operating system (OS) having an integral fault handling module includes the steps of: setting an intercept flag when a central processor fault occurs if the fault is to be directed to a preprocessor; establishing a safestore frame which includes information identifying the type of fault and whether the intercept flag is set; and transferring control to the OS fault handling module; then in the OS fault handling module, determining whether the intercept flag is set; if the intercept flag is not set, handling the fault in the OS fault module; if the intercept flag is set, transferring control from the OS fault module to an Intercept Process written in machine language; and handling the fault in the Intercept Process. This renders the resolution of faults due to correctable CPU design errors independent of the OS employed at a given installation and customizable to a given system without the need to revise the OS fault modules for each OS. As each such design error is worked out (e.g., by installing a substitute integrated circuit in which the error has been corrected), the Intercept Process (and CPU firmware) can be modified to remove monitoring and handling for faults due to the corrected error.

3 Claims, 5 Drawing Sheets

FAULT INTERCEPT AND RESOLUTION PROCESS INDEPENDENT OF OPERATING SYSTEM

CROSS REFERENCE TO RELATED PROVISIONAL APPLICATION

This application claims the benefit of the filing date of U.S. provisional patent application Ser. No. 60/032,442 filed Dec. 3, 1996, entitled INTERCEPT PROCESS by Sidney L. Andress.

FIELD OF THE INVENTION

This invention relates to computer central processors and, more particularly, to the repetitive temporary storage of central processing register contents and supporting information in a safestore in order to facilitate recovery from a fault or transfer to another domain. Still more particularly, this invention relates to a safestore feature which intercepts certain faults resulting from known system design errors and diverts the resolution process for handling such faults from the operating system fault handling facility to a special purpose software fault handling facility.

BACKGROUND OF THE INVENTION

As personal computers and workstations have become more and more powerful, makers of mainframe computers have undertaken to provide features which cannot readily be matched by these smaller machines in order to stay viable in the marketplace. One such feature may be broadly referred to as fault tolerance which means the ability to withstand and promptly recover from hardware faults and other faults without the loss of crucial information. The central processing units (CPUs) of mainframe computers typically have error and fault detection circuitry, and sometimes error recovery circuitry, built in at numerous information transfer points in the logic to detect and characterize any fault which might occur.

The CPU(s) of a given mainframe computer comprises many registers logically interconnected to achieve the ability to execute the repertoire of instructions characteristic of the CPU(s). In this environment, the achievement of genuinely fault tolerant operation, in which recovery from a detected fault can be instituted at a point in a program immediately preceding the faulting instruction/operation, requires that one or more recent copies of all the software visible registers (and supporting information also subject to change) must be maintained and constantly updated. This procedure is typically carried out by reiteratively sending copies of the registers and supporting information (safestore information) to a special, dedicated memory or memory section.

When a fault occurs and analysis determines that recovery is possible, the safestore information is used to reestablish the software visible registers in the CPU with the contents held recently before the fault occurred so that restart can be instituted or tried from the corresponding place in program execution.

The logical design of modern CPUs, particularly mainframes, is enormously complex. Inevitably, logic design errors are present as the design process proceeds. If the specific hardware in which a design error is discovered is still in development, it can simply be corrected, sometimes with appropriate changes in firmware. However, if the faulting condition occurs so rarely and is so elusive that it is only discovered after systems have been installed for commercial and/or other field operation, the correction of the hardware/firmware (for example, by replacing an integrated circuit having the design error with one in which the error has been corrected) can be time consuming. Similarly, if a rarely occurring hardware fault is discovered during development, there may be good reason, such as meeting delivery schedules, to forego any immediate attempt to effect a definitive hardware/firmware correction. In both instances, a conventional, and generally effective, prior art approach has been to set up the CPU firmware to detect and refer faults to a fault processing module written into the operating system.

There are, however, drawbacks to this approach. When design errors are discovered, the resolution process for the resulting fault must be incorporated into the fault handling module operating system itself. This can be not only a formidable task, but the revisions to the operating system in all the systems in existence can be disruptive of normal operation. Further, some mainframe CPUs are configured to run under a plurality of operating systems. This requires changes to the fault processing modules of each operating system which can be accommodated by the CPUs. Still further, certain system design errors are often worked out, even after commercialization, as very large scale integrated circuits are modified and the chips changed out in individual installations. As a result, a feature in the operating system(s) introduced to handle a problem which no longer exists may adversely affect performance and certainly increases the amount of code in the operating system. It is to the solution of these related problems that the present invention is directed.

OBJECTS OF THE INVENTION

It is therefore a broad object of this invention to provide, in a central processor, fault tolerant operation in which the storage and recovery of safestore information to handle certain faults is handled independent of the operating system.

It is a more specific object of this invention to provide a fault tolerant CPU in which the fault recovery process for certain predetermined faults is diverted from the operating system fault processing module to an independent facility implemented in software written in machine specific language.

SUMMARY OF THE INVENTION

Briefly, these and other objects of the invention are achieved, in a fault tolerant central processing unit having data manipulation circuitry including a plurality of software visible registers, by providing a safestore memory for storing the contents of the plurality of software visible registers, after a data manipulation operation, in order to facilitate restart after a detected fault by transferring the corresponding contents of the safestore memory back to the software visible registers during recovery from the detected fault. More particularly, the subject process is employed in a computer system functioning under an operating system (OS) having an integral fault handling module and includes the steps of: setting an intercept flag when a central processor fault occurs if the fault is to be directed to a preprocessor; establishing a safestore frame which includes information identifying the type of fault and whether the intercept flag is set; and transferring control to the OS fault handling module; then in the OS fault handling module, determining whether the intercept flag is set; if the intercept flag is not set, handling the fault in the OS fault module; if the intercept flag is set, transferring control from the OS fault module to an Intercept Process written in machine language; and handling the fault in the Intercept Process.

This renders the resolution of faults due to correctable CPU design errors independent of the OS employed at a given installation and customizable to a given system without the need to revise the OS fault modules for each OS. As each such design error is worked out (e.g., by installing a substitute integrated circuit in which the error has been corrected), the Intercept Process (and CPU firmware) can be modified to remove monitoring and handling for faults due to the corrected error.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
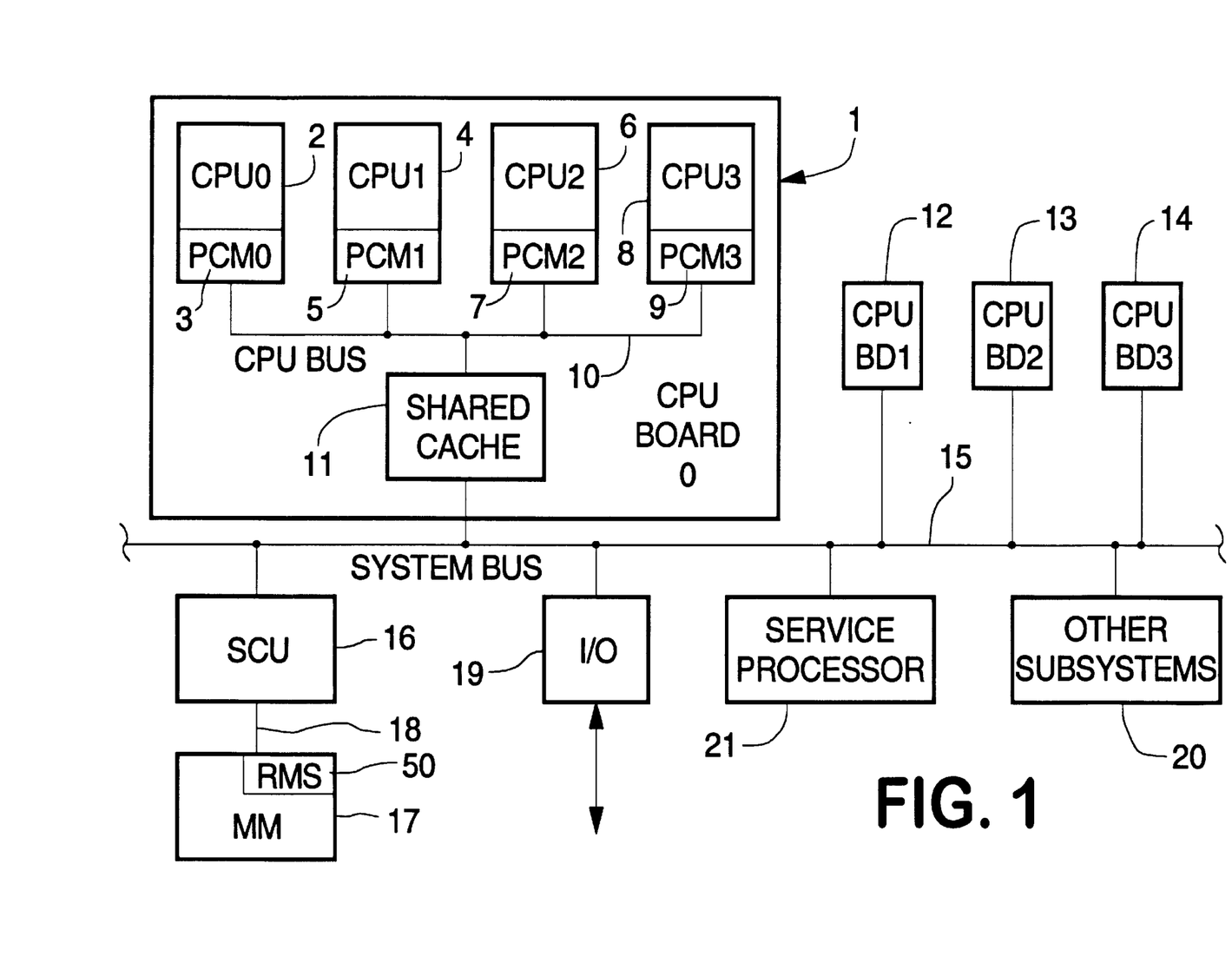
FIG. 1 is a high level block diagram of an multiprocessor computer system which is an exemplary environment for practicing the invention.

Attention is first directed to FIG. 1 which is a high level block diagram of an exemplary multiprocessor computer system incorporating the invention. A first CPU board (CPU Board "0") 1 includes four central processor units 2 (CPU "0"), 4 (CPU "1"), 6 (CPU "2"), 8 (CPU "3"). Each of the central processor units 2, 4, 6, 8 situated on the first CPU board 1 includes an integral private cache memory module, 3, 5, 7, 9, respectively. The private cache modules 3, 5, 7, 9 are each configured as "store into"; i.e., the results of each completed operation performed in the CPU are stored into the private cache. Each of the private cache modules 3, 5, 7, 9 on CPU Board "0" 1 interface with a CPU bus 10 for direct communications between the CPUs 2, 4, 6, 8.

In the exemplary system, there are three additional CPU boards 12 (CPU Board "1"), 13 (CPU Board "2") and 14 (CPU Board "3"), each of which is substantially identical to CPU board 1 although those skilled in the multiprocessor art will understand that each CPU board and each CPU on each of the boards is assigned a unique identification number to facilitate communication and cooperation among the CPUs in the system.

CPU board 1 (i.e., CPU Board "0") also includes a shared cache 11 disposed between ("bridging") the CPU bus 10 and a system bus 15. It will be understood that each of the CPU boards 12, 13, 14 also each includes a CPU bus and a shared cache, identically oriented.

A system control unit 16 serves to couple the system bus 15 to a main memory unit 17 via a memory bus 18. (It will be noted that the main memory unit 18 includes a Reserved Memory Space 50—RMS—which will be discussed further below.) In addition, one or more input/output units 19 interface the system bus 15 with various input/output subsystems, not shown, to achieve input/output functions on a system basis, all as well known to those skilled in the art. Similarly, other subsystems 20, not otherwise specified or shown, may be connected to the system bus 15 to complete a given multiprocessor system. System control unit 16 also conventionally provides a multi-phase clock to all the system units requiring a common clock source. A service processor 21, typically a commercial personal computer or workstation, serves not only as a system and maintenance console, but also is used to boot the system and is employed extensively in analyzing and processing faults.

Figure 2:
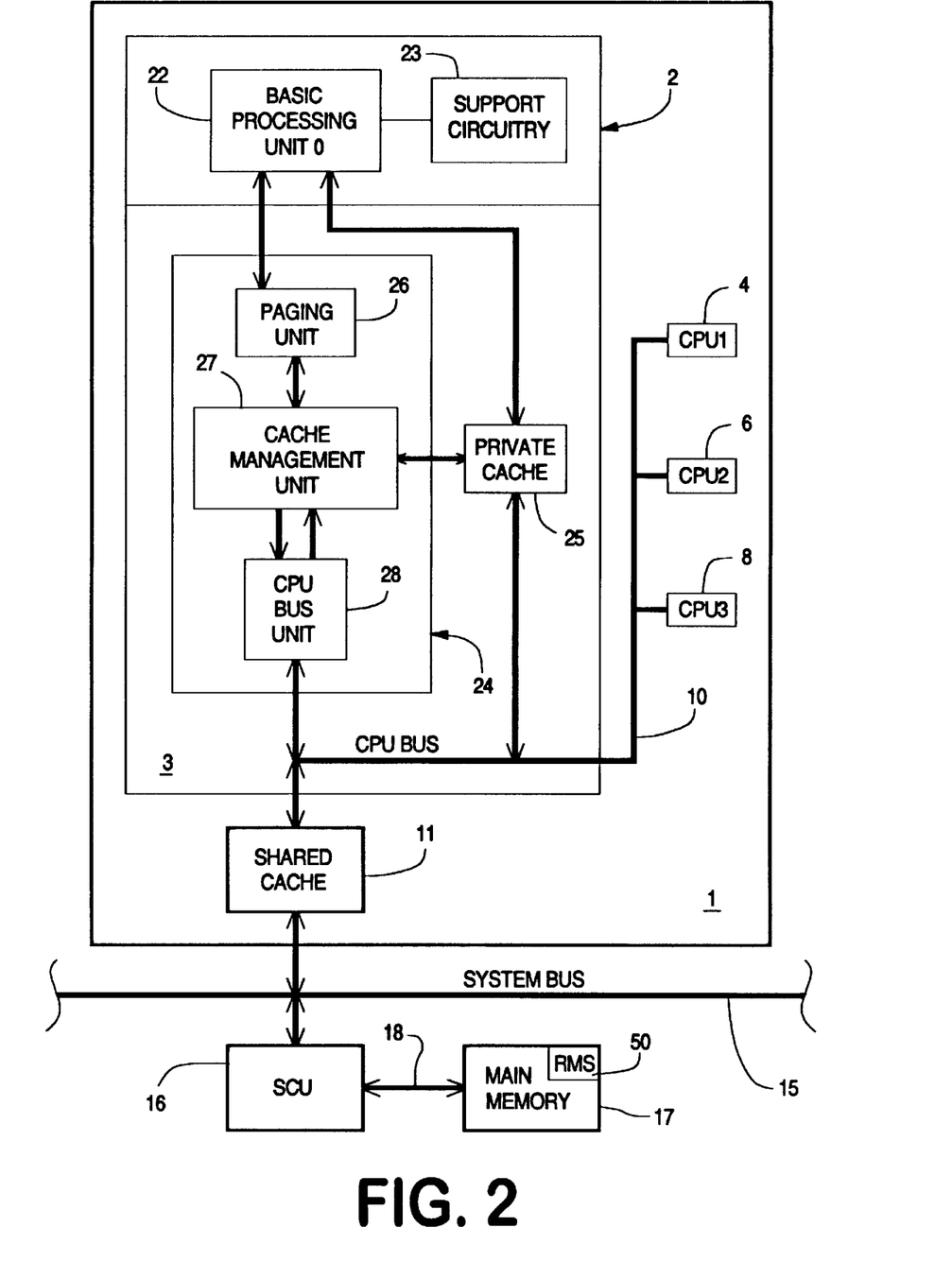
FIG. 2 is a slightly lower level block diagram showing additional details of an exemplary CPU board in the multiprocessor system of FIG. 1.

FIG. 2 is a slightly lower level block diagram of CPU "0" 2 of CPU board 1 (CPU Board "0") illustrating additional structure which is present in each CPU in the system. CPU "0" 2 includes a basic processing unit 22 and support circuitry 23 therefor.

As previously described, CPU "0" 2 also includes private cache module "0" 3 which constitutes a cache control unit 24 and a private cache 25 (which itself includes additional logic to be described below). Cache control unit 24 includes paging unit 26, cache management unit 27 and CPU bus unit 28. Paging unit 26 interfaces with basic processing unit "0" 22 and cache management unit 27. Cache management unit 27 also interfaces with private cache memory 25 and CPU bus unit 28. CPU bus unit also interfaces with CPU bus 10 and, via CPU bus 10, shared cache 11. Private cache 25 is also coupled directly to receive information from and send information to the CPU bus 10 and to receive information from and send information to basic processing unit "0" 22.

As previously described, shared cache 11 also interfaces with system bus 15 and, via system bus 15, with system control unit 16 and other systems/subsystems shown in FIG. 1. Main memory 17, including Reserve Memory Space 50, may be accessed via the system control unit 16 and memory bus 18.

It will be seen that there are numerous paths for information flow among the various blocks shown in FIGS. 1 and 2. The types of information may include control, address, instructions and operands. A given CPU may directly access its own private cache module and indirectly access the private cache modules incorporated into the other CPUs on a shared CPU board. Thus, CPU "0" 2 can access, via the CPU bus 10, the shared cache 11 it shares with CPU "1" 4, CPU "2" 6 and CPU "3" 8. CPU "0" 2 can also, under defined conditions, access the private cache module of CPU "2" 6 (for example) via the CPU bus 10 to effect a local "siphon". Further, CPU "0" 2 can access (via CPU bus 10, shared cache 11 and system bus 15) the shared caches (not shown) on each of CPU Board "1" 12, CPU Board "2" 13 and CPU Board "3" 14. Still further, a given CPU may indirectly access the private cache modules (not shown) of a CPU (not shown) on another CPU board; e.g., CPU "0" on CPU board 1 (CPU Board "0") may, under defined conditions, access the private cache module of any one of the CPUs on CPU Board "2" 13 (FIG. 1) via CPU bus 10, shared cache 11, system bus 15 and the shared cache on CPU Board "2" to effect a remote "siphon".

Further yet, for example, CPU "0" 2 can access main memory 17, including RMS 50, via CPU bus 10, shared cache 11, system bus 15, SCU 16 and memory bus 18. Still further, for example, CPU "0" 2 can access, via CPU bus 10, shared cache 11 and system bus 15, any other block shown coupled to the system bus 15 in FIG. 1 to achieve bilateral communication with input/output devices, other subsystem components and even other multiprocessor systems.

Figure 3:
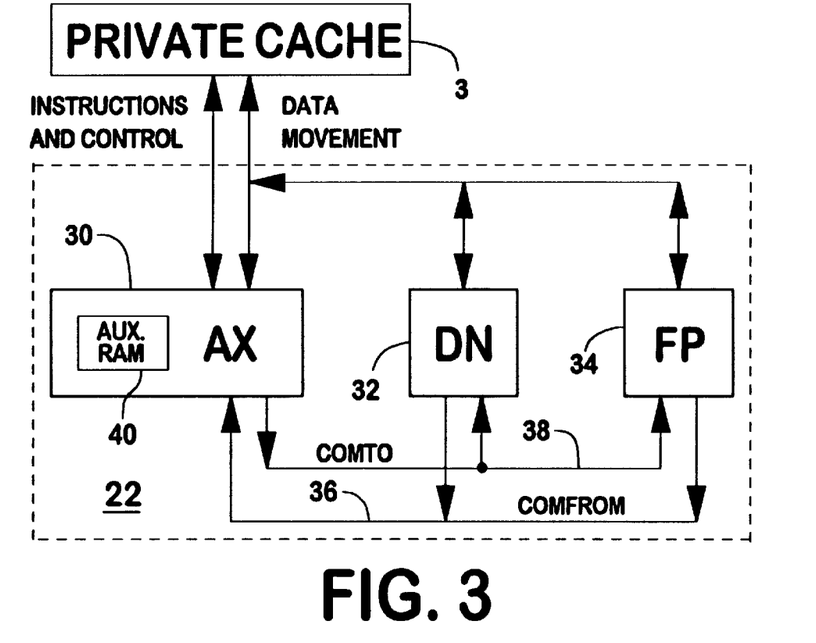
FIG. 3 is a block diagram showing additional details of a basic processing unit including within each CPU on the CPU board shown in FIG. 2.

FIG. 3 is a block diagram which includes additional details of a basic processing unit 22 in a system incorporating the present invention. The Address and Execution (AX) unit 30 is a microprocessing engine which performs all address preparation and executes all instructions except decimal arithmetic, binary floating point and multiply/divide instructions. The main functions performed by the AX unit 30 include: effective and virtual address formation; memory access control; security checks; register change/use control; execution of basic instructions, shift instructions, security instructions, character manipulation and miscellaneous instructions; and CLIMB safestore file.

Efficient scientific calculation capability is implemented in the Floating Point (FP) coprocessor unit 34. The FP unit 34 executes all binary floating point arithmetic. This unit, operating in concert with the AX unit 30, performs scalar or vector scientific processing. The FP unit 34: executes all binary and fixed and floating point multiply and divide operations; computes 12 by 72-bit partial products in one machine cycle; computes eight quotient bits per divide cycle; performs modulo 15 residue integrity checks; executes all floating point mantissa arithmetic; executes all exponent operations in either binary or hexadecimal format; preprocesses operands and post-processes results for multiply and divide instructions; and provides indicator and status control.

The DN unit 32 performs the execution of decimal numeric Extended Instruction Set (EIS) instructions. It also executes Decimal-to-Binary (DTB), Binary-to-Decimal (BTD) conversion EIS instructions and Move-Numeric-Edit (MVNE) EIS instructions in conjunction with the AX unit 30. The DN unit both receives operands from and sends results to the private cache 3. A COMTO ("command to") bus 38 and a COMFROM ("command from") bus 36 couple together the AX unit 30, the DN unit 32 and the FP unit 34 for certain interrelated operations.

The AX unit 30 includes an auxiliary random access memory 40 which is used to store safestore (and other) information. Thus, the contents of the auxiliary RAM 40 are constantly updated with, for example, duplicates of the contents of software visible registers and other relevant information subject to change (collectively, the Safestore Frame or SSF) such that, in the event of the occurrence of a fault from which recovery has been determined to be possible, processing may be restarted at a point just prior to the fault by transferring the most recent register set stored in the auxiliary RAM 40 back to reestablish the register set.

The straightforward use of a safestore is known in the prior art as exemplified by U.S. Pat. No. 5,276,862, entitled SAFESTORE FRAME IMPLEMENTATION IN A CENTRAL PROCESSOR by Lowell D. McCulley et al; U.S. Pat. No. 5,553,232, entitled AUTOMATED SAFESTORE STACK GENERATION AND MOVE IN A FAULT TOLERANT CENTRAL PROCESSOR by John E. Wilhite et al; and U.S. Pat. No. 5,557,737 entitled AUTOMATED SAFESTORE STACK GENERATION AND RECOVERY IN A FAULT TOLERANT CENTRAL PROCESSOR by John E. Wilhite et al, all incorporated by reference herein for their disclosure of the repetitive storage of safestore information in a safestore memory and the use of safestore information in recovery from a fault.

Figure 4:
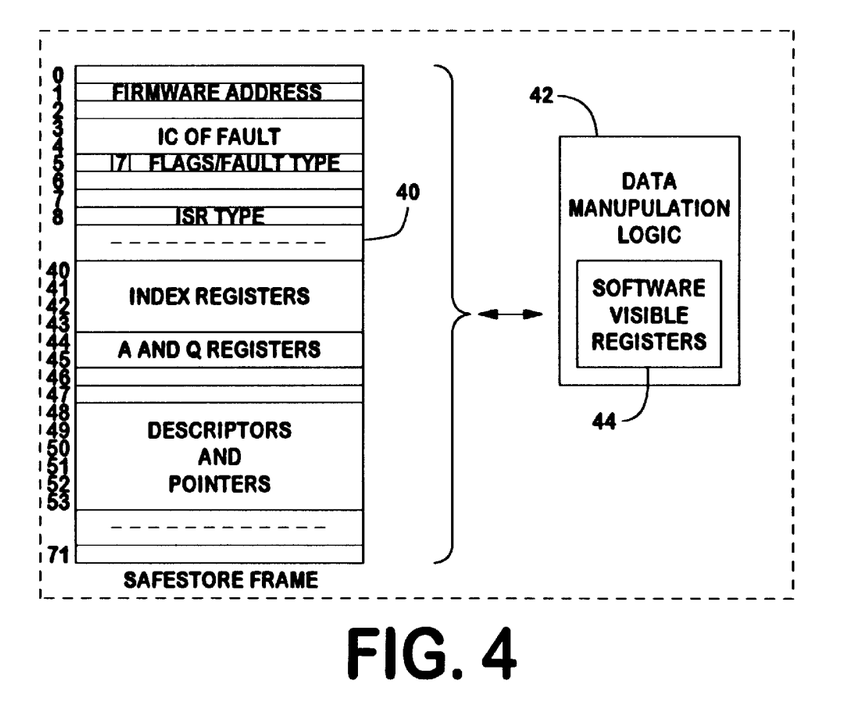
FIG. 4 is a revised block diagram of the basic processing unit particularly showing the relationship of an auxiliary random access memory to the basic processing unit and its software visible registers (and supporting information) in accordance with the subject invention, the random access memory storing, inter alia, a Safestore Frame.

As previously noted, the AX unit 30, DN unit 32 and FP unit 34 are, collectively, referred to as the basic processing unit (BPU) 22. Referring now to FIG. 4, it will be understood that the AX unit 30, (except for the auxiliary RAM 40), DN unit 32 and FP unit 34 and their support circuitry 23 (FIG. 2) are represented by the data manipulation logic block 42 in order that the auxiliary RAM 40 can be discussed in greater detail in the following discussion of the invention.

Intercept Process provides a fault preprocessor that can review fault situations and provide machine assembly language level assistance in managing system design problems. The provision of a fault handling module incorporated directly in a mainframe operating system to handle known design errors is well known and effectively permits full functionality operation of a system until a new hardware release is delivered, at which time the fault handling module sections for handling the design errors which have been corrected can be disabled. However, there are conditions under which this basic approach has drawbacks. First, each fault correction routine in a fault handling module integral with an operating system remains until a new version of the operating system (a relatively rare event) even though the fault may have been corrected, for example, by substitution of an updated integrated circuit for one having the design fault. Second, the fault handling facility is not operating system independent for those machines which can run more that one operating system.

In accordance with the present invention, the preprocessor is invoked via CPU hardware/firmware to allow a common machine assembly language routine, stored in RMS 50, to function with a plurality of operating systems. (It may be noted that this technique is also useful in processing Service Processor related tasks.) A system design flow chart of the Intercept Process as adapted to the present invention is shown in FIG. 5.

Figure 5:
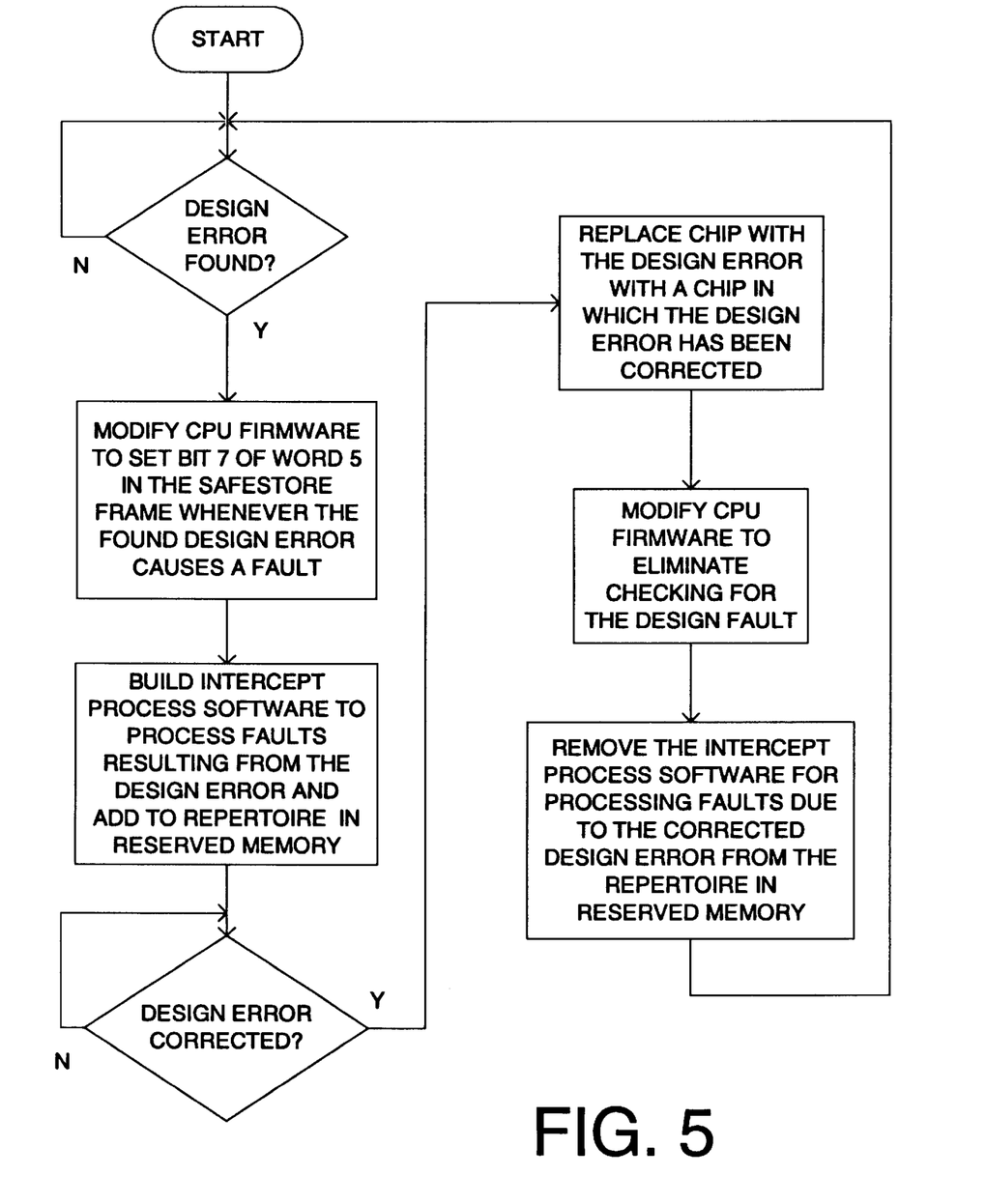
FIG. 5 is a system design flow chart of the intercept Process used in handling faults in accordance with the invention.

Thus, as shown in FIG. 5, if a hardware design error is discovered, the CPU firmware is modified to set an Intercept flag (in the example, bit 7 of word 5 in the Safestore Frame) whenever the design error causes a fault. The Intercept Process code is built or modified to process the fault caused by the design error. If and when the design error is later corrected and an integrated circuit chip having the design error has been replaced by a chip in which the error has been corrected, the CPU firmware is modified to eliminate checking for the design fault. If desired, the fault handling code for the fault can be removed from the Intercept Process code stored in RMS.

Figure 6:
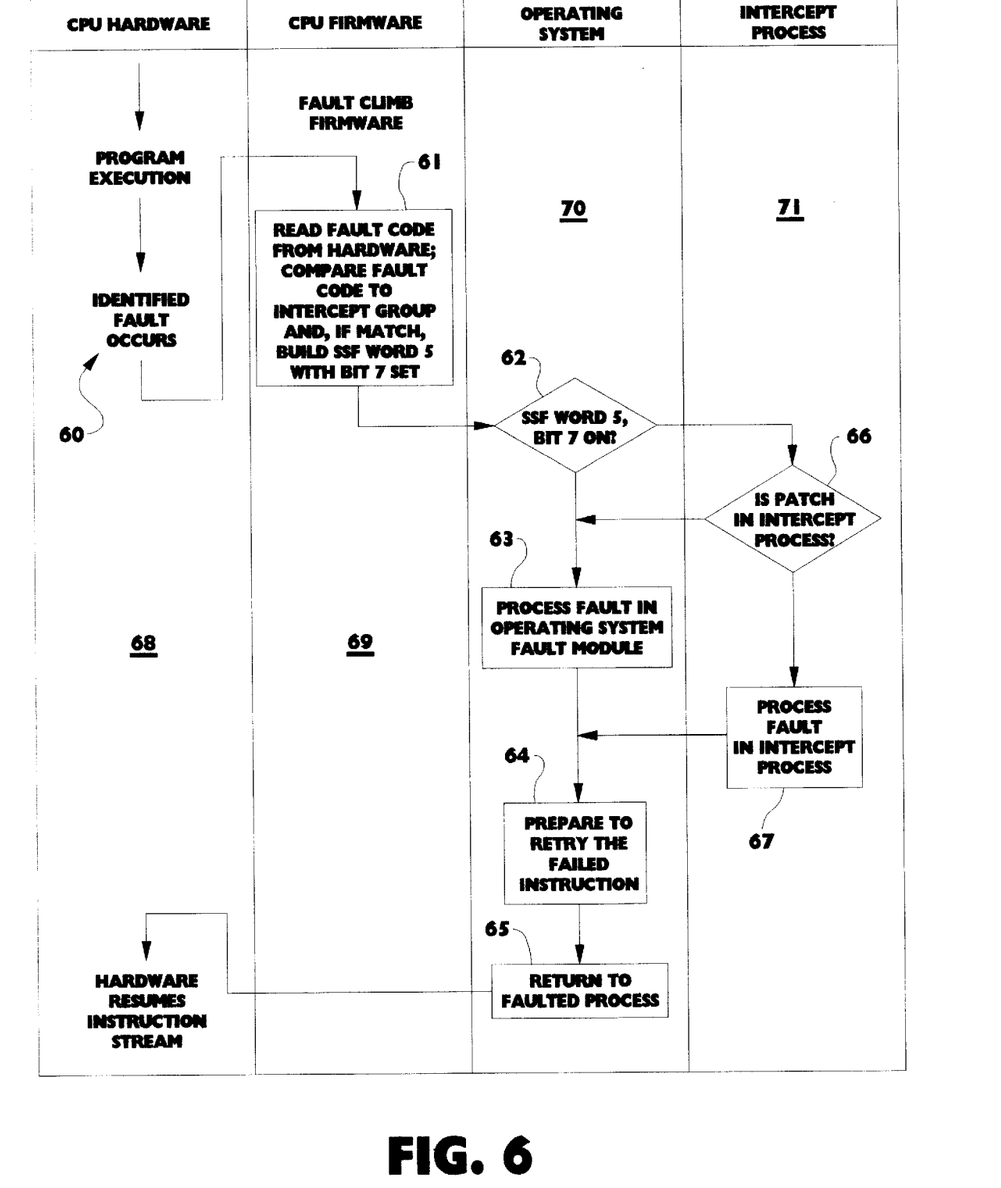
FIG. 6 is a process flow diagram illustrating the Intercept Process and the cooperation between CPU hardware, CPU firmware, the operating system and the subject Intercept Process in handling faults.

In accordance with the invention, the intercepting process is carried out using operating system software to detect hardware indicators requesting transfer to the special purpose Intercept Process machine assembly language code which is stored in RMS 50 by the Service Processor 21 during system initialization. As shown in FIG. 6, Intercept Process 71 can, independent of the operating system in use, take corrective action then return to the faulting process or pass the fault back to the operating system fault module 70 if no defined action for Intercept Process is detected. (It may be noted that the Intercept Process can also initiate certain tasks for the Service Processor, then return to the faulting process although this is not shown in FIG. 6 as this feature is not a part of the subject invention.)

Specific faults to be intercepted are established during the initialization of the CPU 68 within its firmware 69. Thus, the Intercept flag can be set on any fault as determined to be necessary by the current processor firmware 69.

As previously described, the Intercept Process 71 is a machine assembly language level process that is loaded into RMS 50 upon system initialization. By being resident in RMS and implemented in machine assembly language, the Intercept Process is functional with all operating systems which run on a given hardware system. The Intercept Process 71 is configured such that any fault type can cause the CPU firmware 69 to invoke it. This is done by setting a dedicated Intercept Fault flag in the "fault type" word of the SSF 61. Therefore, an Intercept Fault can "piggy-back" on a system level fault.

The Intercept Fault flag has priority over all system level faults. When the operating system detects the presence of the Intercept Fault flag 62, it transfers control to the Intercept Process 71 before any processing of the current fault is performed. This will permit any corrective action of which the Intercept Process 71 is capable to occur before an undesired recovery action is taken by the operating system's fault module 70.

The Intercept Process is customized for each release/version of the CPU firmware. This feature provides the ability for each release of processor firmware to specify the revision(s) to Intercept Process. This is a substantive improvement over the prior art in which the operating system fault module had to carry fixes for all known design errors which ever existed in the CPU design (at least since the previous operating system release) because the operating system fault module could not determine the CPU firmware revision.

This process provides the ability to use CPU (under one or more proprietary operating systems) with known design errors and to quickly resolve customer problems while the hardware change is being developed. The Intercept Process is 71 tied to the release of processor firmware. When the Service Processor loads the selected processor firmware during initialization, it also places the corresponding Intercept Process into Reserved Memory; thus, the firmware version and the Intercept Process version must match.

As previously noted, the Intercept Process 71 resides in RMS 50 in main memory 17 starting on a page boundary and, in the example, is sixteen consecutive pages in size. These are real pages of memory defined by the Service Processor 21 when the Intercept Process is loaded during system initialization. The location of the Intercept Process in RMS is defined in a predetermined word of the system configuration area of RMS.

Preferably, the mapping of the real pages in RMS storing Intercept Process code is into the same working space as the operating system's fault module. Otherwise, the Intercept Process would be required to correct for problems in all working spaces in the system, and the changing of the working space registers' contents would cause additional work for the operating system upon return from the Intercept Process.

The Intercept Process 71 requires only limited use of the system registers to perform its function in order to correspondingly limit the impact upon the operating system when the Intercept Process is invoked. The following defines the descriptor and pointer registers used by the Intercept Process:

D0=Return descriptor with pointer register having the location within the operating system's fault module.

D3=Frames the SSF entry that has the Intercept Process flag set. The Intercept Process will look at data from the SSF to determine the corrective action required.

D4=The Instruction Segment Register of the failed process. (There may be cases where the Intercept Process will have to examine the failing code as part of the recovery routine.)

In the example, the Intercept Process will transfer through "Pointer Register 0" to return to the operating system fault module. An "inter-segment transfer" is used to return to the operating system fault module to avoid affecting the Safestore Frame stack. As shown in FIG. 6, if there is no process for handling a given design fault resident in Intercept Process 71, a Transfer through Pointer Register 0 by Intercept Process causes the operating system fault module 70 to try a restart of the faulting process (i.e., invoke a retry of the failed instruction 64, 65). (If it faults again, the problem may be referred to the Service Processor, and a CPU freeze could result.) A Transfer through Pointer Register 0-plus-one by Intercept Process causes the operating system fault module to process the fault defined in the SSF entry.

Assuming that a patch for a given fault is resident in the current Intercept Process version, the Intercept Process uses "Descriptor Register 3" to access the faulting process SSF. Referring briefly to FIG. 4, to analyze the reason for the request to the Intercept Process and to handle the fault, the following data in the SSF is needed:

| | |
|---|---|
| Firmware Address | (SSF Word 1) |
| IC of Fault | (SSF Word 3 or 4) |
| Fault Flags and Code | (SSF Word 5) |
| ISR type (ns/ei) | (SSF Word 8) |
| Index (X) Registers | (SSF Words 40–43) |
| A and Q Registers | (SSF Words 44–45) |
| Descriptors/Pointers | (SSF Words 48–53) |

The A and Q Registers are the CPU's accumulator and supplementary accumulator registers, respectively. Other SSF information may be referenced. The Intercept Process, which modifies only limited information within the SSF, uses "Descriptor Register 4" to access the faulting process instruction stream. To understand the reason why the fault occurred requires an analysis of the instruction stream for conditions that can occur with the hardware signature value. The Intercept Process will not modify any instruction within the stream.

The Intercept Process 71, as necessary in the example, uses the A, Q, X1, X4 and X5 registers to perform its analysis of the intercepted fault. All program visible registers will be saved before they are used by the Intercept Process, and the contents of these registers will be restored to their original values before exiting the Intercept Process.

When any of the defined CPU faults occur, they proceed through the CPU fault priority logic and form a seven-bit fault code for the highest priority fault. After this step is performed in the normal way, the CPU fault firmware compares the seven-bit code to determine if the detected fault is in the group intended for "intercept" handling. If it is, bit 7 in SSF Word 5 is set "on" indicating that an intercept request is nested with this fault. The Intercept Process is not introduced into hardware and therefore does not have any effect on existing fault priorities.

As shown in FIG. 6, when the Intercept Flag is set on in the current SSF Word 5 62, then the operating system will transfer to the first location of the Intercept Process code using a descriptor established during system initialization.

The code within the Intercept Process 71 does not generate faults as the operating system fault module 70 in the example is not able to handle a second fault (there is no hardware enforcement of this rule). In a multiprocessor system, the Intercept Process returns to the same CPU 68 (conventionally identified by a System Identification Number or the equivalent) that initiated the request for service. This measure reduces the overhead of managing interrupts and faults within the Intercept Process.

Two special purpose instructions are used with the Intercept Process. These two instructions are used to provide certain processor mode permissions while executing within Intercept Process. The two special purpose instructions are SICPM (Set Intercept Mode) and RICPM (Reset Intercept Mode). The SICPM instruction is one of the first instructions executed by Intercept Process after control has been transferred to Intercept Process to ensure that the correct CPU mode and permissions are set before any other instructions are executed. The RICPM instruction is one of the last instructions executed by the Intercept Process each time it is called to recover a fault. This instruction resets the processor mode and permissions to the state that they were in when the SICPM instruction was executed.

The Intercept Process 71 enters at location zero of the first page that was defined to the operating system by the Service Processor when the system is initialized. This common entry point is the only entry point into the Intercept Process. The Intercept Process needs to identify itself to the system when it is in execution so that the hardware and firmware can automatically recover for errors encountered due to system mode and permissions. The Intercept Process identifies itself to the hardware by the execution of the previously discussed SICPM instruction. The execution of this instruction causes the hardware to set an internal flag indicating that the Intercept Process is temporarily in control of the CPU. A housekeeping routine saves the processor's program visible registers. In the example, the registers are saved by physical processor using X Register 7. This insures that the Intercept Process will have complete use of all program visible registers and still be able to return to the operating system fault module with the registers in the state and with the content as when they were called.

The first step of processing an Intercept request is to determine the type of fault that caused the request. This is achieved by getting the fault type from the current SSF. DR3 is required to frame the current SSF. The seven-bit fault type generated by the CPU firmware is resident in bits 11–17 of Word 5 in the SSF. This value is used as an index into a processing table.

The next level of the Intercept Process 71 execution routine is fetched from a functionality table. If the entry in this table for the fault type in not negative (bit zero="0"), then the entry has the offset within the Intercept Process where the present fault type is to be processed. (If the entry in this table for the fault type is negative (bit zero="1"), then there is no next level process routine, and control will be transferred to process an Service Processor I/O request. This feature is outside the present invention.)

In this manner, control is passed to the execution routine within Intercept Process for handling the specific fault type. It is at this level that the rules about the fault are applied to determine if the current fault qualifies for recovery. The rules, of course, vary depending upon the fault type and hardware problem(s) that caused the error conditions. When Intercept Process support is required for a certain fault type, the fault handling function is appropriately defined.

The Intercept Process 71 has two exits, and both cause the operating system to continue processing, but with different logic paths. A first exit from the Intercept Process causes the operating system to retry 64, 65 the failed instruction after the fault has been handled by Intercept Process. A second exit 66 from the Intercept Process causes the operating system to continue its processing of the fault 63 and to resolve it if possible. (Although not shown in FIG. 6, it is also possible that the operating system fault module will refer the fault to the Service Processor which might freeze the faulting CPU and reconfigure the system as necessary.)

Regardless of the exit point, the program visible registers must be restored before retuning to the operating system's fault module. The Intercept flag (bit 7 in Word 5 in the SSF) will be reset as part of the wrap up processing in the Intercept Process.

As previously noted, the return from the Intercept Process to the operating system fault module is a lateral transfer using Pointer and Descriptor Register Zero. This type of transfer must be done since this is the same type of transfer used to enter the Intercept Process.

The foregoing description describes the invention in the environment of a multiprocessor computer system; however, it will be appreciated by those skilled in the art that the invention may be used with equal effect in a uniprocessor system which includes iterative execution instructions.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a computer system functioning under an operating system including a fault handling module, a process for handling a central processor fault comprising the steps of:
   A) employing, when a central processor fault occurs during an operation, a modifiable central processor firmware, which firmware is configured to recognize a central processor fault which is due to a known hardware design error and which firmware is reconfigured after the known hardware design error has been corrected to eliminate monitoring for faults due to the known hardware design error, for:
      i. sensing said central processor fault;
      ii. selectively setting, while establishing a safestore frame, an intercept flag if the fault is to be directed to a preprocessor;
      iii. establishing said safestore frame which includes information identifying the type of fault and whether the intercept flag is set; and
      iv. transferring control to the operating system fault handling module;
   B) in the operating system fault handling module, determining whether the intercept flag is set;

C) if the intercept flag is not set, handling the fault in the operating system fault handling module and going to step F);

D) if the intercept flag is set, transferring control from the operating system fault handling module to an intercept process written in machine language;

E) handling the fault in the intercept process; and

F) retrying the operation which caused the fault in the central processor.

2. The process of claim 1 in which the current version of the central processor firmware and the current version of the intercept process are each matched to a central processor hardware release currently in use for a given central processor.

3. The process of claim 2 in which the intercept process and central processor firmware are loaded upon initialization of the system in which the central processor is resident.

* * * * *